(12) United States Patent
Gau et al.

(10) Patent No.: US 6,748,084 B1
(45) Date of Patent: Jun. 8, 2004

(54) DATA ACCESS CONTROL SYSTEM AND METHOD THEREOF

(75) Inventors: Min-Jea Gau, Taipei (TW); Yen-Sha Chen, Tainan (TW); Wen Tsuei, Keelung (TW); Wen-Hsin Yang, Hsinchu (TW); Jen-Chieh Cheng, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/395,192

(22) Filed: Sep. 14, 1999

(30) Foreign Application Priority Data

May 20, 1999 (TW) ........................ 88108252 A

(51) Int. Cl.$^7$ ............................ H04L 9/00; G06F 11/30
(52) U.S. Cl. ........................ 380/286; 380/277; 713/165; 713/180; 713/201
(58) Field of Search ................................ 380/286, 277, 380/30; 713/165, 200, 201, 180, 150; 705/71

(56) References Cited

U.S. PATENT DOCUMENTS

| 4,408,203 A | * | 10/1983 | Campbell et al. ............. 705/71 |
| 5,337,043 A | | 8/1994 | Gokcebay ................. 340/5.67 |
| 5,764,767 A | | 6/1998 | Beimel et al. ............... 713/180 |
| 5,940,507 A | * | 8/1999 | Cane et al. ................. 713/165 |

OTHER PUBLICATIONS

Mei–Jea Gau, "Access Control System Based on Secret Sharing". CCL Technical Journal, pp. 49–52, Dec. 5, 1998.
Bruce Schneier, "Special Algorithms for Protocols". Applied Cryptography Protocols, Algorithms, and Source Code in C. P. 527–529, 1996.
Dario Catalano et al. "New Efficient and Secure Protocols for Verifiable Signature Sharing and Other Applications". Proceeding of CRYPTO 1998, p. 105–120.
L. Harn et al. "Password Authentication Using Public–Key Cryptography". Computers Math. Applic., vol. 18, No. 12, pp. 1001–1017, 1989.

* cited by examiner

Primary Examiner—Emmanuel L. Moise
(74) Attorney, Agent, or Firm—Rabin & Berdo, P.C.

(57) ABSTRACT

A data access control system and a method thereof is disclosed. First, the master key is divided into n subkeys to be kept by n holders, by way of secret sharing. The master key reconstruction procedure utilizes the shared secret with the subkey holders to obtain m subkeys (1<m<n) and then reconstructs the master key, using the (m,n)-threshold scheme. The system then uses the master key to access the data. Thus, m subkeys are required to reconstruct the master key in order to amend or read the data in the system.

23 Claims, 6 Drawing Sheets

DATA ACCESS CONTROL SYSTEM AND METHOD THEREOF

This application incorporates by reference Taiwanese application Serial No. 88108252, Filed 1999 May 20.

BACKGROUND OF THE INVENTION

1. Field of the Invention

The invention relates in general to a data access control system and a method thereof, and more particularly to a system and method, using secret sharing and dynamic password, in order to increase the security of data access while data log-in is performed.

2. Description of the Related Art

Due to the rapid developing of computer system and the technique of storage media, the data of a variety of systems, such as on-line transaction, mail delivery, database and electrically stored information communications are accessed electrically. The popularity of digital access brings convenience to the users, however, also causes some side effects. Counterfeit and manipulation become even harder to detect and trace while the data is electrically stored. Taking the bank transaction system as an example, the credit card paying system is stored with card numbers of cardholders, details of each transaction and personal references. The privacy of cardholders could not be well protected if the bank is lack of secure control system. Therefore, it is highly demanded to encrypt important information so that administrators are able to control the information better and the related staff can be kept away from the temptation of counterfeit.

As mentioned above, data have to be encrypted to insure the security. However, freely accessing all the encrypted data by a single data administrator would be insecure. Moreover, we have to ensure that the data should not be accessed by the previous data administrator and as less as possible of the encrypted data needed to be amended. This kind of problem is frequently met. Taking a server of electrical transaction as an example, its database contains the personal references of cardholders.

For a control procedure for data management system of a bank, the data is not allowed to be handled, read or erase by a single staff, particularly, when the data includes any of the following features.

(1) The recorded data represents the status of the procedure.

(2) The system contains data not desired to be read.

Referring to FIG. 1, which shows a block diagram of a conventional data access control system. As a system user 11 is accessing the data on-line or locally, via the internet 13, the inputted data will be sent to the data access control system 15 as cipher text or directly. In the data access control system 15, the data is encrypted, if desired, by servers or the storage processing unit 151. The data is then sent to and stored in the data storage unit 153. The data access of the system is controlled by a key K of a storage processing unit 151 to prevent the data being read by unauthorized persons. Since the key K is usually controlled a single data administrator, the following problems may occur:

(1) data administrators could interrupt the normal procedure to counterfeit and manipulate the data in the data storage unit;

(2) the selection of a key holder is hard since the key is completely controlled by the key holder;

(3) all the cipher text has to be changed because of the transference or resign of the key holder, which is time-consuming.

A system of secret sharing is disclosed in U.S. Pat. No. 5,764,767 by Beimel et al. Referring to FIG. 2A, Secret S, such as a code of a safe, is divided n Secret Shares $s_i$ ($i=1\sim n$) by a dealer 21, using a method provided by Shamir and Blakley. The n Secret Shares $s_i$ of the Secret S along with n Key $K_i$ are delivered to n Participants $P_i$, respectively. Referring to FIG. 2B, the Key $K_i$ is composed of n−1 Key Constituents $k^i_j$ ($j=1\sim n$, $i \neq j$). The Key Constituents $k^i_j$ is for each Participant $P_i$ to communicate with other Participants $P_j$ ($j \in [1,n]$, $j \neq i$). Referring to FIG. 2C, the Secret S reconstructing procedure includes the following steps. First, m ($1 < m < n$) Participants $P_j'$ ($j \in [1,m]$) are selected from n Participants $P_i$, and at least one Participant $P_k'$ ($k \in [1,n]$) is denoted from m Participants $P_j'$ as a Recipient to execute. Then, the Recipient $P_k'$ receives and decrypts the encrypted Secret Shares $s_j'$ from the other m−1 Participants $P_j'$ ($j \neq k$), and utilizes the m−1 Secret Shares $s_j'$ and his own Secret Share $s_k'$ (m Secret Share $s_i$ in total) to reconstruct the Secret S. In addition, the Recipient $P_k'$ receives m−1 Secret Share $s_j'$ and completes decrypting by using his own n−1 Key Constituent $k^i_j$.

According to the above-mentioned secret reconstruction system, secret data has to be divided into a number of secret shares to be shared by the respective participants. To reconstruct the secret data, each participant needs to obtain the authority of all the other participants. For example, each $K_i$ includes n−1 Key Constituent $k_j^i$ to communicate with other Participants $P_i$. As a result, if any one of the Participants is changed, the process of secret reconstruction becomes redundant. In addition, little error of any one participant may cause unrecoverable mistake, since the system proposed by Beimel et al. is not designed particularly for the managing member to obtain the secret data. Moreover, since the recipient utilizes the key constituent to obtain the encrypted secret shares from other participants and the encryption method does not change along with each load in, it is easy to be recognized while the procedure is repeated and the system is restarted.

SUMMARY OF THE INVENTION

It is therefore an object of the invention to provide a system and method for the control of data access. A key is first divided into a number of subkeys for different key holders. The accessing right of the data administrator is therefore distributed and the above-mentioned problems of the conventional system and method are overcome. By packaging the subkey to form a dynamic code while data log-in is performed, the system security is then increased.

It is another object of the invention to provide a method for data access control, wherein a master key is used to access data. The method includes the following steps. The master key is first divided into n subkeys and the subkeys are kept separately, wherein a (m,n)-threshold scheme is used, and m is a natural number larger than 1 but smaller than n. A master key is then used for the reconstruction procedure to obtain m subkeys in order to reconstruct the master key. Next, the master key is used to encrypt and decrypt said data while said data is desired to be accessed.

It is therefore a further object of the invention to provide a method for secure data access control, wherein a master key is used to access data. The method includes the following steps. First, the master key is divided into a number of subkeys that are kept separately. Next, a master key reconstruction procedure and dynamic data log-in are utilized to obtain a number of subkeys in order to reconstruct the master key. Then, the master key is used to encrypt and decrypt said data while said data is desired to be accessed.

It is therefore another object of the invention of the invention to provide a data access control system for accessing data. The system includes the following elements: a data storage unit for saving the data; a master key for encrypting and decrypting the data; a subkey control module for dividing the master key into n subkeys, using a (m,n)-threshold scheme, wherein m is a natural number larger than 1 but smaller than n; a master key reconstruction module which receives m subkeys to reconstruct the master key; and a data control module ,which uses the master key reconstructed by the master key reconstruction module to control accessing the data form the data storage unit.

Thus, anyone, including the data administrator, has to obtain m subkeys to reconstruct the master key in order to amend and read the data. Hence, the data are effectively protected. Even if any subkey holder is transferred or resigned, simply by changing one subkey, the master key can be reconstructed. Therefore, the influence of changing the code to the original encrypted data is highly reduced.

Moreover, while the system is accessing the data, the master key reconstruction program also can use the shared secret with the subkey holder to obtain m subkeys (1<m<n), by applying the function of dynamic data log-in.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

It is supposed that a master key is used for controlling data access in a data managing system. In accordance with a method of secret sharing, the master key is divided into a number of subkeys for different subkey holders. At least two subkeys are required for the system to reconstruct the master key and accomplish the decrypting step. The number of subkey n is determined by the system.

Different arbitrary numbers $c_i$, i=1, . . . , n are given to each subkey holders respectively, wherein i=1, . . . , n, $c_i \in [1, \ldots, p-1]$. According to the (m,n)-threshold scheme proposed by Shamir and Blakley, a polynomial f(x) with (m−1) orders is obtained, wherein 1<m<n, f(x) distributes in finite field GF(p), and p is a prime. The system hides the master key in the constant f(0). Thus, n subkeys f($c_i$) can be obtained, wherein i=1, . . . , n. The (m−1) order polynomial f(x) can be represented as what is followed.

$$f(x) = \sum_{i=0}^{m-1} b_i x^i \bmod p$$

wherein mod is a congruence operator, p is also a congruence divisor, and, $b_0$, $b_{i} \neq 0$, $b_i \in [1, \ldots, p-1]$.

The system distributes n subkeys f($c_i$) to n different subkey holders, respectively. To obtain the master keys, at least f($c_i$) and $c_i$ of m subkey holders are required. $c_i$ can be kept by the $i^{th}$ subkey holder or saved in the system directly. Then, f(x) can be obtained by applying LaGrange Interpolation Theorem and therefore the master key f(0) can be produced. As shown in equation (1), the value of m is the threshold value of the (m,n)-threshold scheme, which can be predetermined by the system.

$$f(x) = \sum_{i \in (1,n)} f(c_i) \frac{\prod_{j \neq i}(x - c_j)}{\prod_{j \neq i}(c_i - c_j)} \qquad \text{Equation(1)}$$

Moreover, a number of operations such as reusing the system are required for the above-mentioned data storage system. Thus, the function of dynamic data log-in of the system can further improve the security of the data in the system.

Figure 1:
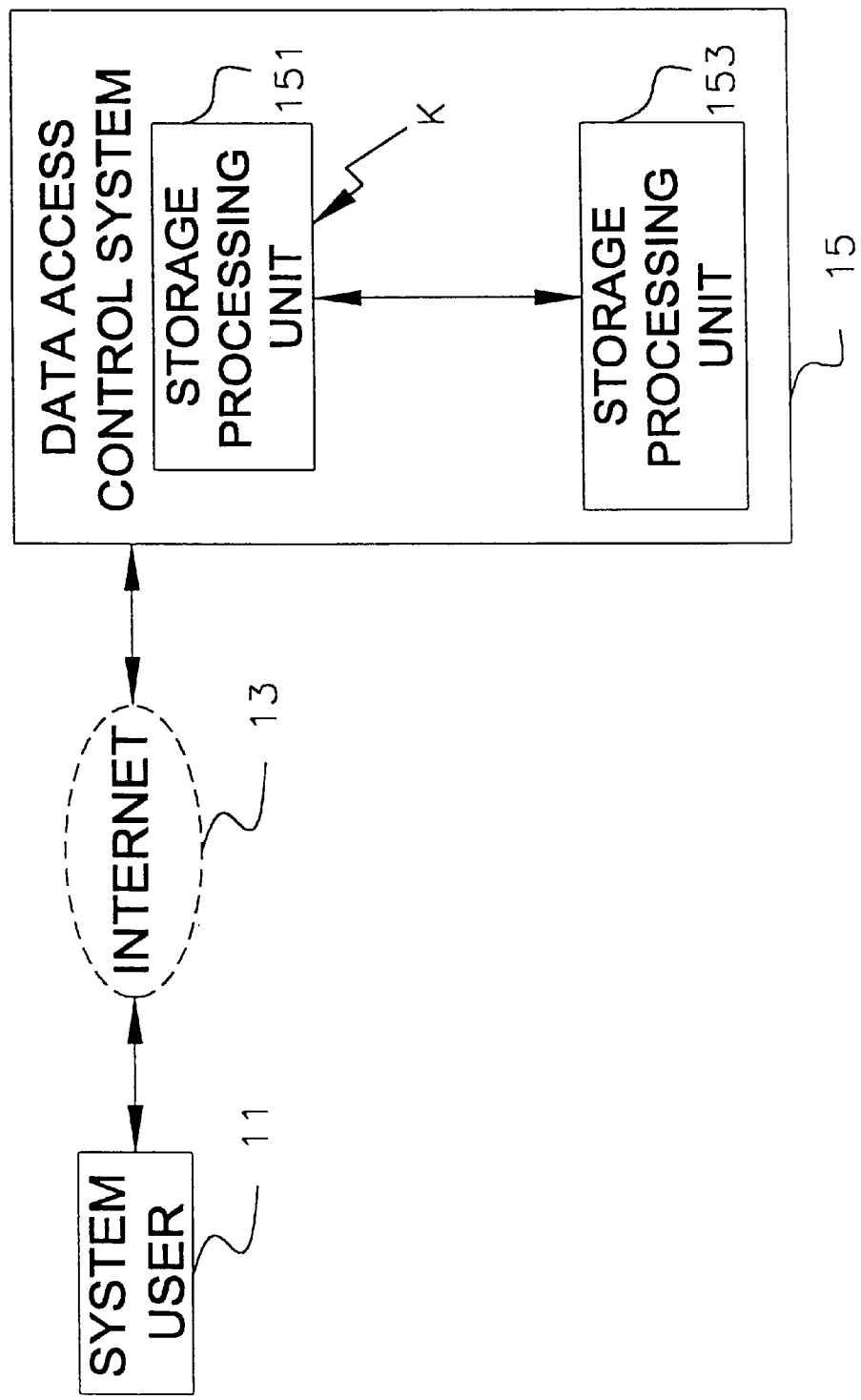
FIG. 1 (Prior Art) is a block diagram showing a conventional data access control system.
Figure 2A:
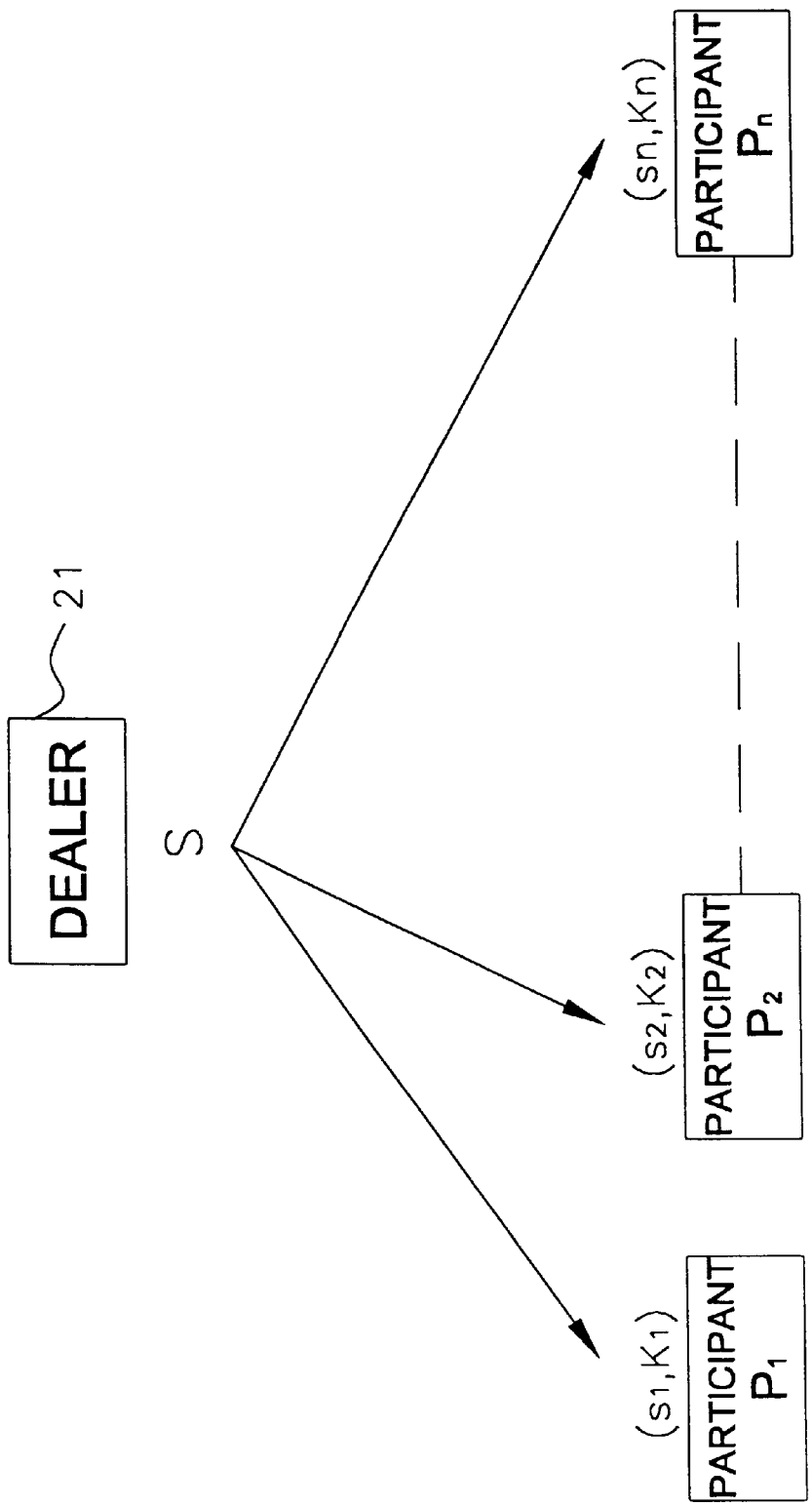
FIGS. 2A~2C (Prior Art) are schematic illustrations showing a conventional system of secret sharing and the reconstruction thereof.
Figure 2B:
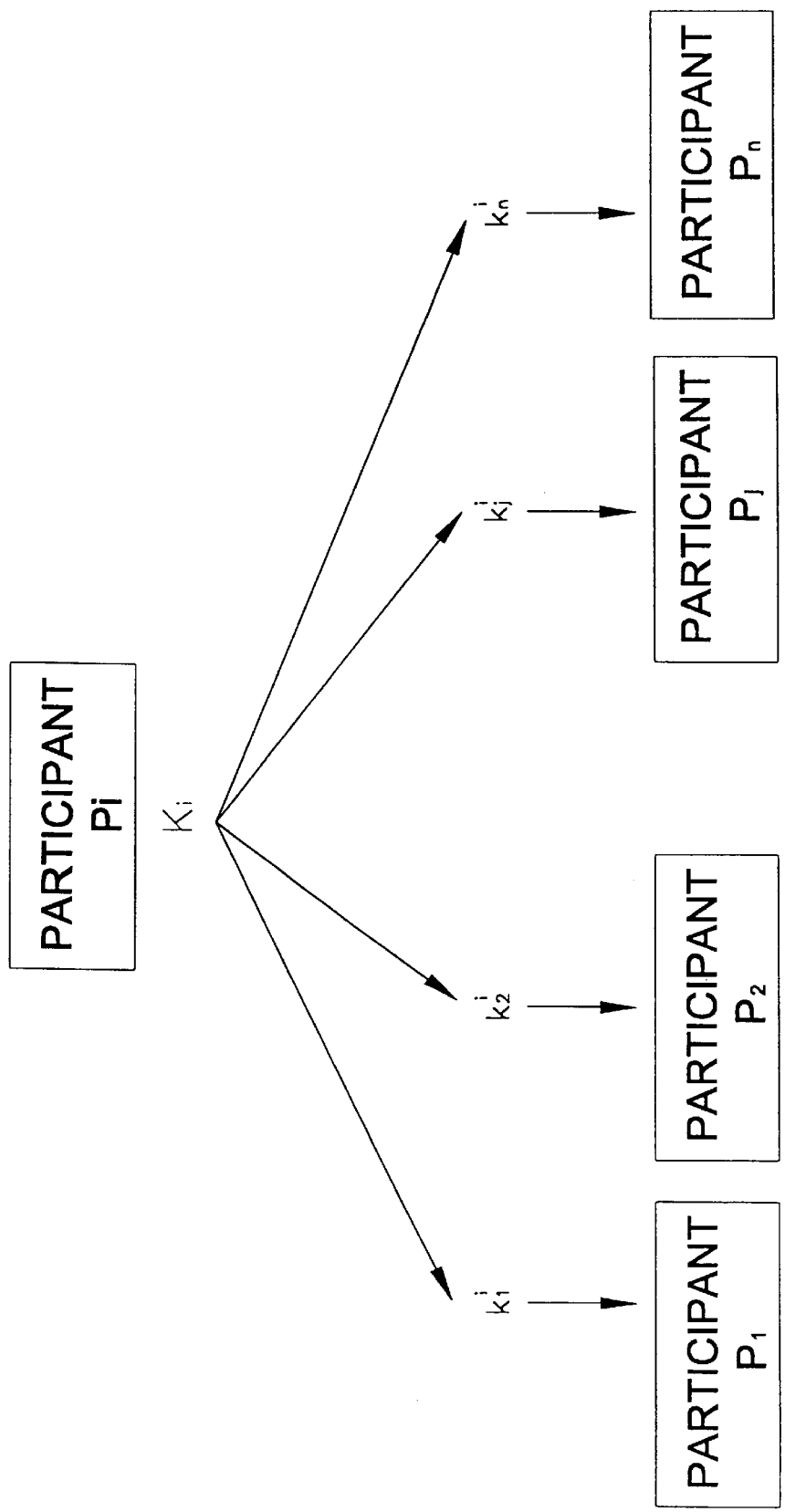
Figure 2C:
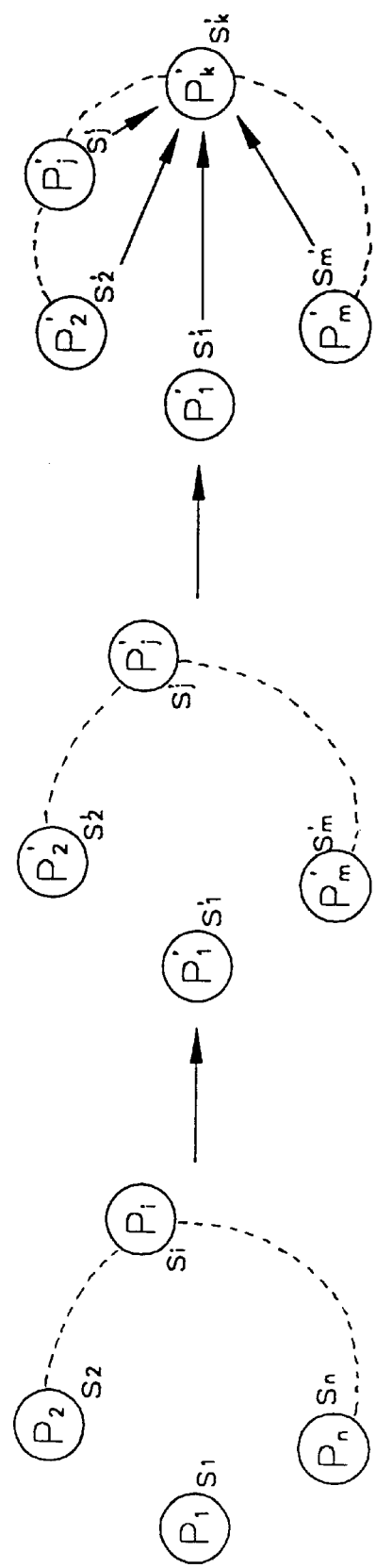
Figure 3:
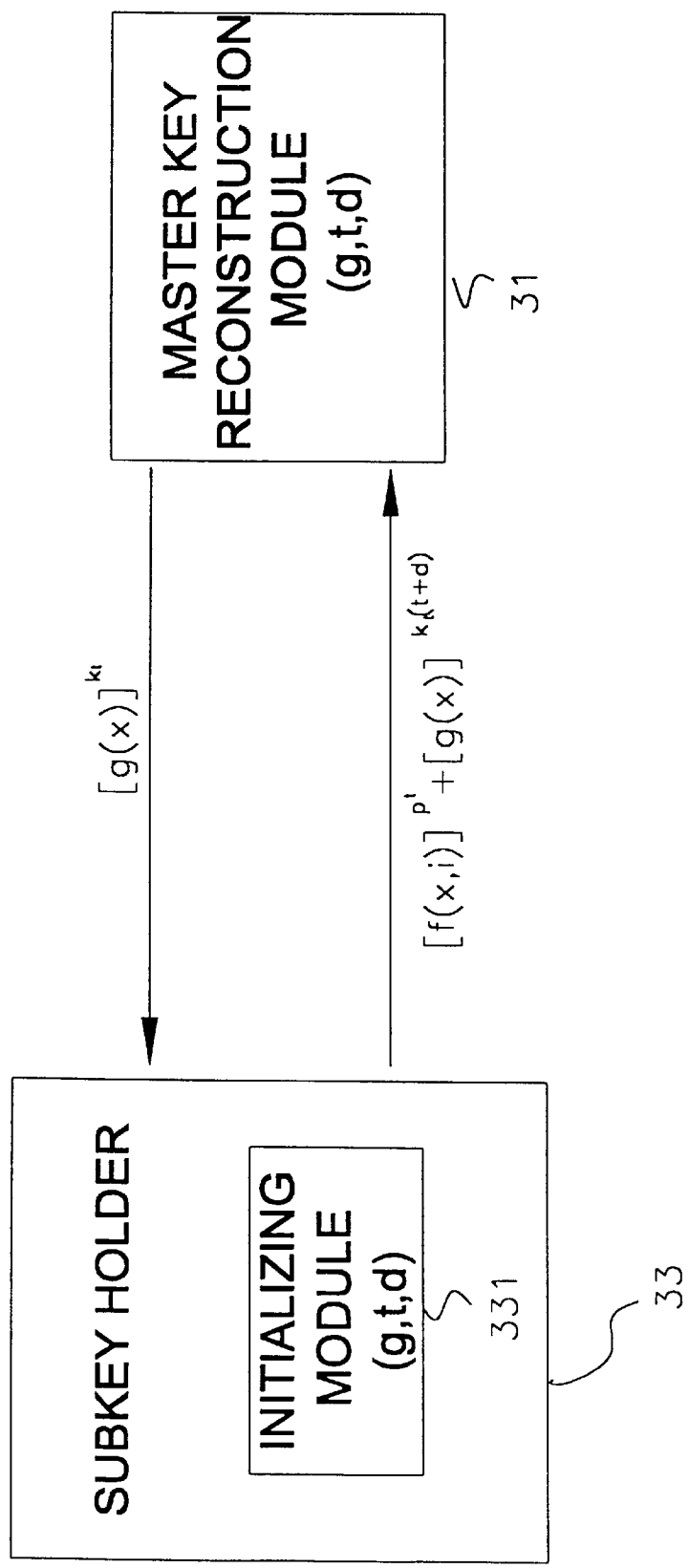
FIG. 3 is a block diagram illustrating the dynamic data log-in function according to a preferred embodiment of the invention.

Referring to FIG. 3, the $t^{th}$ code, a polynomial based on g(x) and $k_t$, $[g(x)]^{k_t}$ is sent from the master key reconstruction module 31 (or so-called master key reconstruction procedure). The polynomial g(x) is the element of GF(p), and also a pre-shared secret of the subkey holder 33 and the master key reconstruction module 31. The number $k_t$ is a random number, generated by the master key reconstruction module 31 when the data storage system is requested to be accessed, for example, changing along with the number of data log-in t, which enhances the security of the system. Next, the subkey holder i 33 makes use of the initializing module 331 (or a initializing procedure), such as a smart card, to package the subkey i, f($c_i$) (called an initial subkey), into a polynomial H(x,i,t) (called a packaged subkey) with an order larger than m, as shown in Equation (2) and Equation (3), wherein the packaged subkey is based on a sum of a first polynomial and a second polynomial; the first polynomial is based on the respective initial subkey f($c_i$) kept by the subkey holder and the second polynomial is based on the code $[g(x)]^{k_t}$, the random number $k_t$, and a shared secret d.

$$H(x,i,t) = [f(x,i)]^{p^t} + [g(x)]^{k_t(t+d)}, \qquad \text{Equation (2)}$$

wherein $$f(x, i) = f(c_i) \times \frac{\prod_{j \neq i}(x - c_j)}{\prod_{j \neq i}(c_i - c_j)} \qquad \text{Equation(3)}$$

The polynomial H(x,i,t), or the packaged subkey, is then sent back to the master key reconstruction module 31. The number d is yielded, given $[g(x)]^{k_t(t+d)}$, as a discrete logarithm problem, so d is a large enough number. In addition, d is a shared secret between the subkey holder 33 and the master key reconstruction module 31. Moreover, the counting of the initializing module 331 and the master key reconstruction module 31 is synchronous. That is to say, the recorded t values of the two are the same. By applying Equation (4), given the code $[g(x)]^{k_t}$ and the order t, the function $f(x)=\Sigma_{i\in[1,n]}f(x,i)$ is obtained by deleting the g(x) part. Then, the master key f(0) is also obtained. The Equation (4) satisfies the features of Finite Field.

$$\Sigma H(x,i,t)=\Sigma[f(x,i)]^{p^i}+[g(x)]^{k_t(t+d)}=[\Sigma f(x,i)]^{p^i}+m[g(x)]^{k_t(t+d)} \text{ Equation(4)}$$

Figure 4:
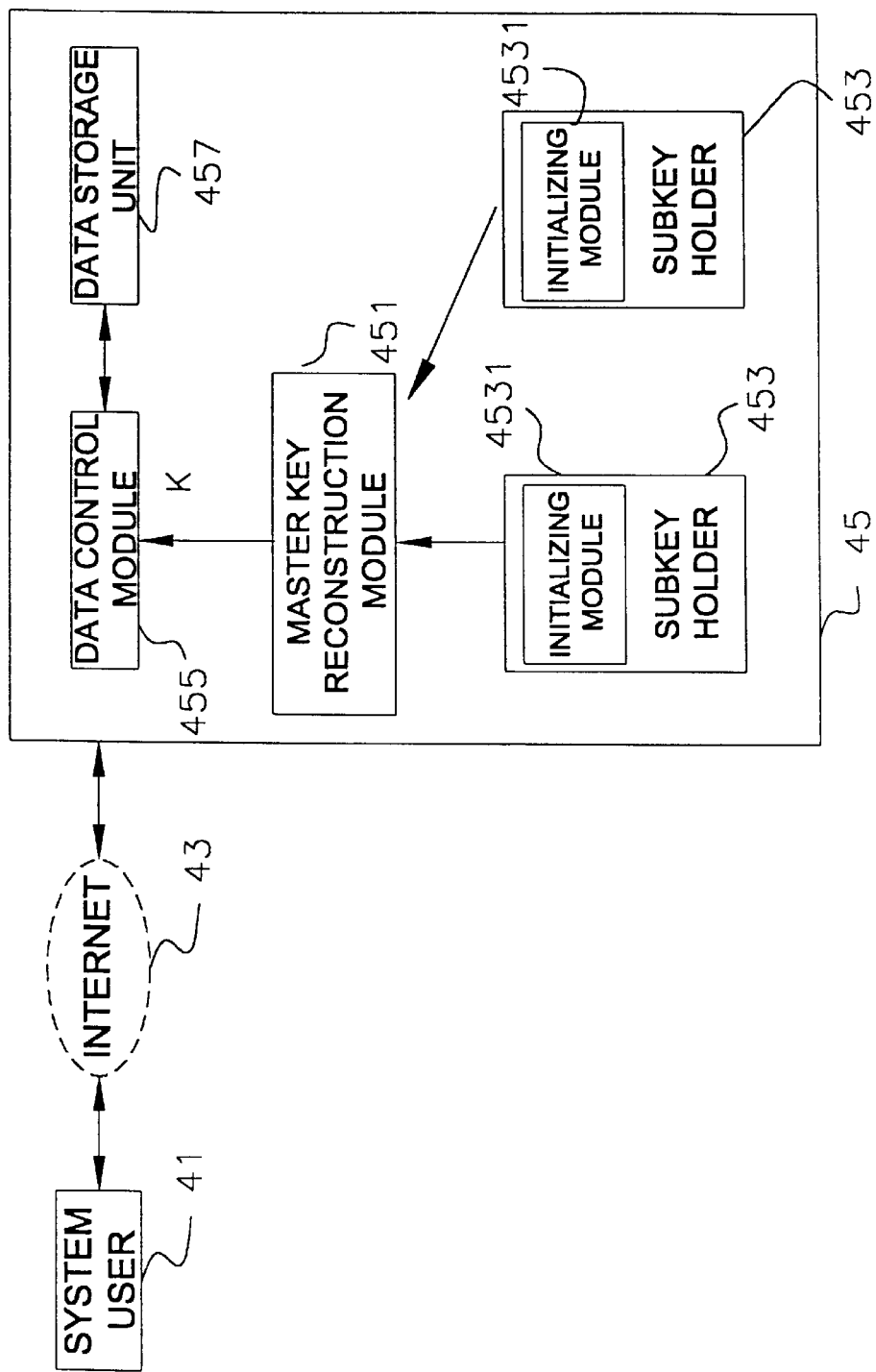
FIG. 4 is a block diagram illustrating the data access control system according to a preferred embodiment of the invention.

Referring to FIG. 4, as the system is initialized, the master key reconstruction module 451 (or program) receives m packaged subkeys from the m subkey holders 453 via the initializing module 4531 (or program), using the above-mentioned dynamic data log-in. f(x) is then obtained by applying Equation (1). Next, the master key K, which is the value of f(0), is obtained and output to the data control module 455 (or program). After receiving the master key K, the data control module 455 is able to control the access of the encrypted data in the data storage unit 457. Moreover, the master key K is reconstructed only when the system is reused. While a system user 41 is accessing the data, the inputted data is transferred, encrypted or directly, to the data access control system 45 via internet 43.

Thus, the invention includes the following characters:

(1) To obtain the master key requires the agreements of a number of subkey holders. Therefore, the possibility of counterfeiting and manipulating the data in the system by the managing member is prevented. The system therefore has the advantage of easy control and administration and high security.

(2) While the subkey holder is resigned or transferred, only the subkey but not the master key has to be changed. Therefore, the influence of changing the code is significantly reduced.

(3) Obtaining the subkey by dynamic data log-in can prevent the code from being recognized even the system is applied frequently, which further enhances the security of the system.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for data access control, wherein a master key is used to control data access in a data storage device when the data storage device is requested to be accessed, the method comprising:

dividing the master key into n initial subkeys which are kept separately, wherein a (m,n)-threshold scheme is used, and m is a natural number larger than 1 but smaller than n an initial subkey i of the n initial subkeys is kept by a subkey holder i and i =1, . . . , n;

using a master key reconstruction procedure to reconstruct the master key according to m packaged subkeys when the m packaged subkeys are received from m of the n subkey holders, comprising the steps of:

sending a code based on a polynomial g(x) and a random number k from the master key reconstruction procedure to the n subkey holders, wherein the polynomial g(x) is a pre-shared secret of the n subkey holders and the master key reconstruction procedure, and the random number k is generated when the data storage device is requested to be accessed; and receiving the m packaged subkeys from m of the n subkey holders, wherein m is smaller than n, and each of the m packaged subkeys is based on a sum of a first polynomial and a second polynomial, where the first polynomial is based on the respective initial subkey kept by the subkey holder and the second polynomial is based on the code, the random number, and a shared secret d which is a shared secret between the n subkey holders and the master key reconstruction procedure; and using the master key to encrypt and decrypt data of the data storage device while said data is desired to be accessed.

2. A method as claimed in claim 1, wherein said step of using the (m,n)-threshold scheme to divide the master key into n initial subkeys further comprises:

producing a polynomial f(x) with (m−1) orders distributed in a finite field GF(p), wherein p is a prime and f(0) is the master key; and giving a plurality of different arbitrary numbers $c_i$, i=1, . . . , n, $c_i\in[1, \ldots, p-1]$ to obtain the n initial subkeys $f(c_i)$.

3. A method as claimed in claim 2, wherein the initial subkey i, $f(c_i)$, of the n initial subkeys is kept by the subkey holder i.

4. A method as claimed in claim 3, wherein the $c_i$ is kept by the subkey holder i, and wherein in said step of using the master key reconstruction procedure to reconstruct the master key according to the m packaged subkeys, the subkey holders of the m packaged subkeys send the respective numbers $c_i$ to the master key reconstruction procedure.

5. A method for secure data access control, wherein a master key is used to control data access in an information system having data, the method comprising:

dividing the master key into n first subkeys that are kept separately by corresponding n subkey holders;

using a master key reconstruction procedure and dynamic data log-in to obtain m second subkeys in order to reconstruct the master key, wherein m is a natural number larger than 1 but smaller than n, comprising the steps of:

sending a code based on a polynomial g(x) and a random number $k_t$ from the master key reconstruction procedure to the n subkey holders when the information system is requested to be accessed, wherein the polynomial g(x) is a pre-shared secret of the n subkey holders and the master key reconstruction procedure, and the random number $k_t$ is generated when the dynamic data log-in is performed; and receiving the m packaged subkeys from m of the n subkey holders, wherein m is smaller than n, and each of the m packaged subkeys is based on a sum of a first polynomial and a second polynomial, where the first polynomial is based on the respective first subkey kept by the subkey holder and the second polynomial is based on the code, the random number $k_t$, and a shared secret d which is a shared secret between the n subkey holders and the master key reconstruction procedure; and using the master key to encrypt and decrypt said data while said data is desired to be accessed.

6. A method for secure data access control as claimed in claim 5, wherein the first subkeys are obtained by a (m,n)-threshold scheme.

7. A method for secure data access control as claimed in claim 6, wherein the (m,n)-threshold scheme comprises:

producing a polynomial f(x) with (m−1) orders distributed in a finite field GF(x), wherein p is a prime and f(0) is the master key; and giving a plurality of different arbitrary numbers $c_i$, i=1, ..., n, $c_i\epsilon[1, ..., p-1]$ to obtain the n first subkeys $f(c_i)$.

8. A method for secure data access control as claimed in claim 7, wherein first subkey i, $f(c_i)$, of the first subkeys is kept by the subkey holder i.

9. A method for secure data access control as claimed in claim 8, wherein said $c_i$ is kept by the subkey holder i, and wherein in said step of using the master key reconstruction procedure and dynamic data log-in to obtain said m second subkeys in order to reconstruct the master key, the subkey holders of the second subkeys send the respective numbers $c_i$ to the master key reconstruction procedure.

10. A method for secure data access control as claimed in claim 8, wherein said dynamic data log-in comprises:
   the subkey holder i receiving [[a]] the code from the master key reconstruction procedure by using an initializing procedure, wherein the code is changed along with a data log-in number of the subkey holder i; and
   the initializing procedure using the code and [[a]] the shared secret d between the master key reconstruction procedure and the subkey holder i to package the first subkey $f(c_i)$ to be a packaged subkey of the subkey holder i, the first subkey $f(c_i)$ being kept by the subkey holder i, and then sending the packaged subkey back to the master key reconstruction procedure.

11. A method for secure data access control as claimed in claim 10, wherein the initializing procedure and the master key reconstruction procedure are counted synchronous and recorded data log-in values of the subkey holder i of the initializing module and the master key reconstruction module are equal.

12. A method for secure data access control as claimed in claim 8, wherein the code is $[g(x)]^{k_t}$, t is a data log-in number of the subkey holder i, g(x) is a polynomial distributed in the Finite Field, and $k_t$ is a random number, changing along with a value of t, and wherein the packaged subkey is $f(x,i)^{p^t}+[g(x)]^{k_t(t+d)}$, and d is the shared secret.

13. A method for secure data access control as claimed in claim 8, wherein the code is $[g(x)]^{k_t}$, t is a data log-in number of the subkey holder i, g(x) is a polynomial distributed in the Finite Field, and $k_t$ is a random number, changing along with a value of t, and wherein the first polynomial is $[f(x,i)]^{p^t}$ and the second polynomial is $[g(x)]^{k_t(t+d)}$ and d is the shared secret.

14. A data access control system for controlling data access with a master key, wherein the master key is divided into n initial subkeys by using a (m,n)-threshold scheme, the n initial subkeys are kept by n subkey holders, m is a natural number larger than 1 but smaller than n, the system comprising:
   a data storage unit for saving data which are encrypted and decrypted with the master key;
   a master key reconstruction module, which receives m packaged subkeys to reconstruct the master key; and
   a data control module, which uses the master key reconstructed by the master key reconstruction module to control accessing the data from the data storage unit:
   wherein when the data storage unit is requested to be accessed:
      the master key reconstruction module sends a code based on a polynomial g(x) and a random number k from the master key reconstruction module to the n subkey holders, wherein the polynomial g(x) is a pre-shared secret of the n subkey holders and the master key reconstruction module, and the random number k is generated when the data storage unit is requested to be accessed; and
      the master key reconstruction module receives the m packaged subkeys from m of the n subkey holders, wherein each of the m packaged subkeys is based on a sum of a first polynomial and a second polynomial, where the first polynomial is based on the respective initial subkey kept by the subkey holder and the second polynomial is based on the code, the random number k, and a shared secret d which is a shared secret between the n subkey holders and the master key reconstruction module.

15. A data access control system as claimed in claim 14, wherein the master key is divided into the n initial subkeys, using the (m,n)-threshold scheme by:
   producing a polynomial f(x) with (m−1) orders distributed in a Finite Field GF(p), wherein p is a prime and f(0) is the master key; and
   giving a plurality of different arbitrary number $c_i$, i=1, ..., n, $c_i\epsilon[1, ..., p-1]$ to obtain the n initial subkeys $f(c_i)$.

16. A data access control system as claimed in claim 15, wherein an initial subkey i, $f(c_i)$, of the n initial subkeys is kept by a subkey holder i of the n subkey holders.

17. A data access control system as claimed in claim 16, wherein said $c_i$ is kept by the subkey holder i, and while the master key is reconstructed, the subkey holders of said m initial subkeys send the respective numbers $c_i$ to the master key reconstruction module.

18. A data access control system as claimed in claim 16, wherein the master key reconstruction module obtains said m packaged subkeys by dynamic data log-in.

19. A data access control system as claimed in claim 18, wherein the system further comprises:
   an initializing module for the subkey holder i, which receives the code from the master key reconstruction module during dynamic data log-in, the code changing along with a data log-in number of the subkey holder i, and uses the code and the shared secret d between the master key reconstruction module and the subkey holder i to package the initial subkey $f(c_i)$ to be a packaged subkey of the subkey holder i, the initial subkey $f(c_i)$ being kept by the subkey holder i, and then sends the packaged subkey back to the master key reconstruction module.

20. A data access control system as claimed in claim 19, wherein the code is $[g(x)]^{k_t}$, t is a data log-in number of the subkey holder i, g(x) is a polynomial distributed in the Finite Field, and $k_t$ is a random number, changing along with a value of t, and wherein the packaged subkey is $[f(x,i)]^{p^t}+[g(x)]^{k_t(t+d)}$, and d is the shared secret.

21. A data access control system as claimed in claim 19, wherein the initializing procedure and the master key reconstruction procedure are counted synchronous and recorded data log-in values of the subkey holder i of the initializing module and the master key reconstruction module are equal.

22. A data access control system as claimed in claim 19, wherein the code is $[g(x)]^{k_t}$, t is a data log-in number of the subkey holder i, g(x) is a polynomial distributed in the Finite Field, and $k_t$ is a random number, changing along with a value of t, and wherein the first polynomial is $[f(x,i)]^{p^t}$ and the second polynomial is $[g(x)]^{k_t(t+d)}$ and d is the shared secret.

23. A method for controlling data access in a data storage device with a master key, wherein the master key is kept secret, n initial subkeys are generated based on the master key by using a (m,n)-threshold scheme and given to n subkey holders respectively, and m is a natural number larger than 1 but smaller than n, the method comprising the steps of:
   requiring agreement of the m subkey holders when a request for accessing the data storage device is made, comprising the step of:

sending a code based on a polynomial g(x) and a random number k to the n subkey holders, wherein the polynomial g(x) is kept secret over the n subkey holders and the random number k is generated dynamically and corresponds to the request for accessing the data storage device;

receiving m packaged subkeys from m of the n subkey holders, wherein m is smaller than n, and each of the m packaged subkeys is based on a sum of a first polynomial and a second polynomial, wherein the first polynomial is based on the respective m initial subkeys kept by the m of the n subkey holders, the second polynomial is based on the code and a shared secret d between the n subkey holders;

reconstructing the master key according to the m packaged subkeys; and using the master key reconstructed according to the m packaged subkeys to encrypt and decrypt data of the data storage device when the data is desired to be accessed.

* * * * *